Figure 1:
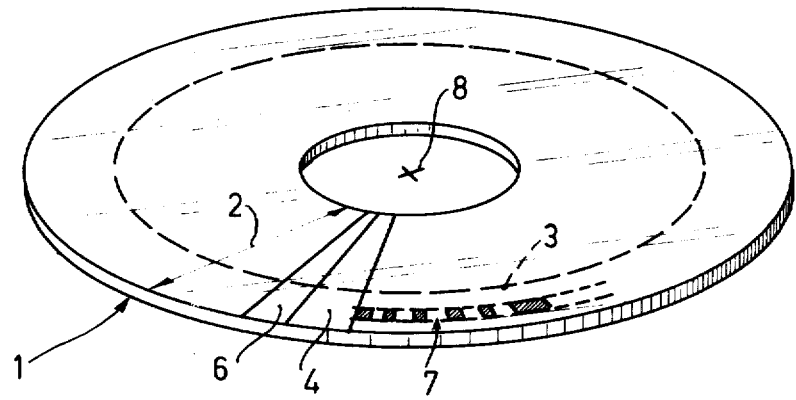

United States Patent [19]

Mes

[11] 3,931,457

[45] Jan. 6, 1976

[54] INFORMATION CARRIER HAVING ADDRESSED INFORMATION TRACKS

[75] Inventor: Johannes Antonius Maria Mes, Eindhoven, Netherlands

[73] Assignee: U.S. Philips Corporation, New York, N.Y.

[22] Filed: Mar. 26, 1973

[21] Appl. No.: 344,637

[30] Foreign Application Priority Data
Sept. 4, 1972 Netherlands............... 12015/72

[52] U.S. Cl. .......................................... 178/6.6 DD
[51] Int. Cl. ............................................. H04n 5/78
[58] Field of Search............... 179/6.6 DD, 6.6 FS; 340/174.1 C, 174.1 J; 360/48, 49, 33

[56] References Cited
UNITED STATES PATENTS

| | | | |
|---|---|---|---|
| 3,331,053 | 7/1967 | Gindi | 360/48 |
| 3,631,421 | 12/1971 | Perkids | 340/174.1 J |
| 3,701,130 | 10/1972 | Ault | 340/174.1 J |
| 3,739,086 | 6/1973 | Hezrer | 340/174.1 J |

Primary Examiner—Vincent P. Canney
Attorney, Agent, or Firm—Frank R. Trifari; Simon L. Cohen

[57] ABSTRACT

A video record for recording optically readable information is provided with a characteristic information code for quick searching of desired information. The information code is preferably provided within the information video lines which preceed the video information in every video signal. The recorded video information can consist of, for example, radiograms, texts for literature retrieval, an encyclopedia, educational information for teaching machines and the like.
In a device for writing in the video information, an encoding addressing unit is incorporated, while a decoding unit can be included in a display unit.

5 Claims, 5 Drawing Figures

INFORMATION CARRIER HAVING ADDRESSED INFORMATION TRACKS

The invention relates to an information carrier for recording audio and/or video information in a series of consecutive information tracks, in which a characteristic information code identifies each individual recorded block of information.

Known information carriers of this kind are, for example, those where magnetic material is deposited on a carrier in the form of a tape, a disc or a drum. The use of such a magnetic storage material implies a comparatively large storage space. When use is made of magnetic tape, an imagedistorting shape variation occurs after prolonged storage, while information carriers in the form of magnetic drums and discs are comparatively expensive and voluminous.

U.S. Pat. No. 3,649,753 describes a magnetic information carrier in which an address derived from the synchronization pulses is associated with each video track. This address is used for searching the information prior to reading out. For selecting a desired video track, it is necessary to count all preceding tracks.

The invention has for its object to eliminate the existing drawbacks and to provide an information carrier which has a characteristic information code, a comparatively small volume and a large information space, which is comparatively inexpensive and in which the addressing is such that it is not necessary to count all preceding tracks for selection.

To this end, a device of the kind set forth is characterized in that the audio-visual information is provided on an information carrier in the form of a geometrical structure which extends along the information tracks and which can be read out in a contactless manner, the information code being provided adjacent to an outer information track of each individual block of information.

Because in an information carrier of this kind, for example, of the type described in, U.S. application Ser. No. 396,399, filed Sept. 12, 1973, which is a continuation of Ser. No. 229,285, filed Feb. 25, 1972, the track width is small with respect to the track width in known magnetic stores, substantially more information can be written on the same surface area, so that substantial savings are realized as regards space and material. The stability of shape of the carrier material is sufficient and the information is sufficiently insensitive to shape variations of the carrier so that image distortion is avoided. Because reading out is performed in a contactless manner, preferably optically, the information-carrying structure is not subject to wear, not even in the case of frequent and intermittent reading out. In a preferred embodiment according to the invention the starting locations of each track are preferably situated on one line which is directed transverse to the direction of the information tracks, each track being provided with an address in the form of a sequential track number.

An information carrier according to the invention is particularly suitable for recording, for example, radiograms such as are made in large numbers in X-ray examinations. It is often sufficient to save a single image per patient with which an address and possibly further alphanumerical data are associated. A device for writing in the information can be provided with an addressing device and, for example, be coupled to an X-ray recording apparatus, the addressed information then being written on a video record according to the invention.

Further applications of an information carrier according to the invention are for information retrieval, for example, of literature which is classified according to subject, as an encyclopedia having an address for each word or each group of words, as a carrier of educational information for a teaching machine, as an audio carrier etc.

The addressed information must be reproduced when the relevant address is called for, so it is a further object of the invention to provide a device which comprises means for locating and reproducing a desired track or group of tracks, the address preferably being displayed in a decoded form. The latter is desired in particular also for checking purposes.

Figure 2:
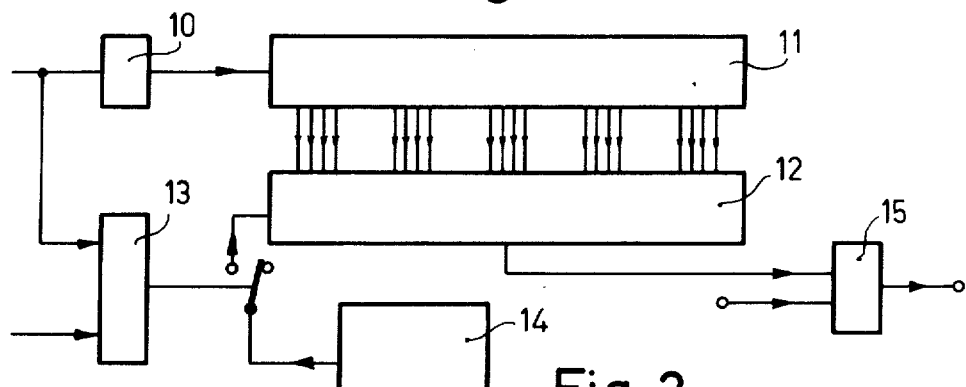
Figure 3:
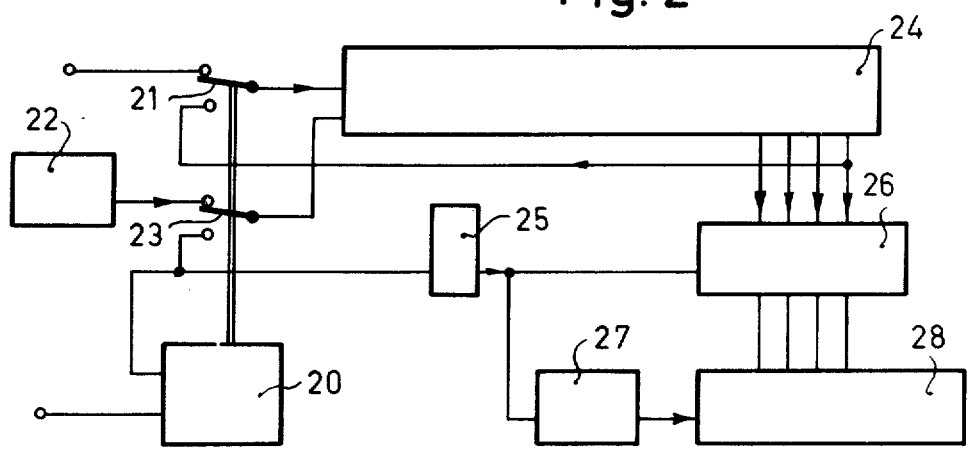
Figure 4:
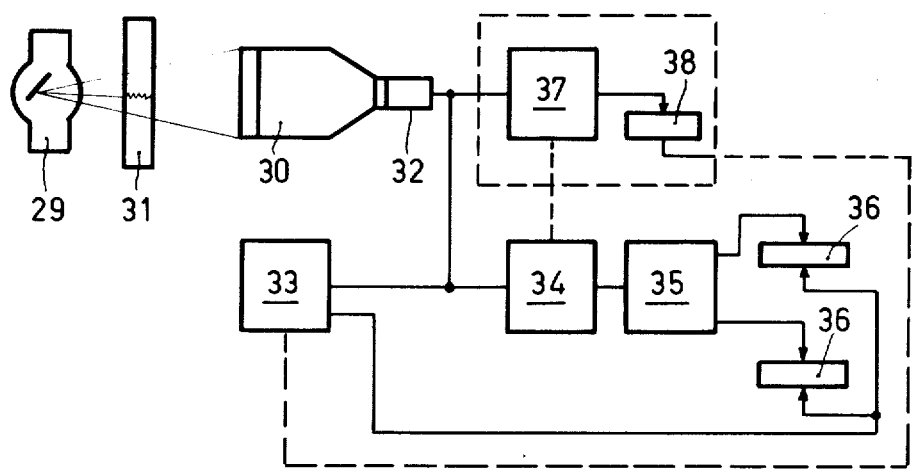
Figure 5:
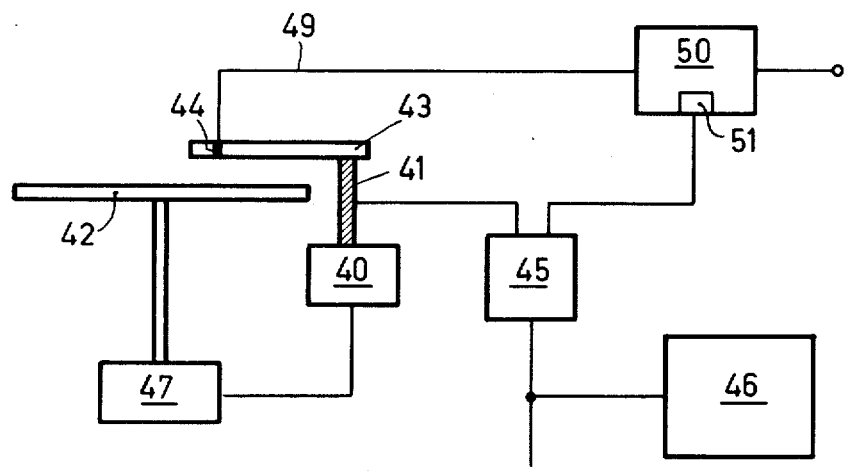

Some preferred embodiments according to the invention will be described in detail hereinafter with reference to the drawings. In the drawings:

FIG. 1 is a diagrammatic perspective view of an information carrier according to the invention, FIG. 2 is a block diagram of an encoding circuit which is suitable for providing the addresses on a video record according to the invention, FIG. 3 is a block diagram of a decoding circuit which is suitable for reading out a video record according to the invention in accordance with the address, FIG. 4 shows a preferred embodiment of a device for recording radiograms on a video record according to the invention, FIG. 5 shows a preferred embodiment for reproducing, by calling for the address, addressed video information of a video record according to the invention.

An information carrier 1 as shown in FIG. 1 can be fully analogous to the information carrier described in U.S. Ser. No. 396,399, filed Sept. 12, 1973 and consists of a disc of, for example, polyvinylacetate on which, for example, 45000 video tracks 3, each having a width of 4–6 microns, are situated over an area which is denoted by an arrow 2. Each video track contains a complete television image signal and a part without image information, all latter parts being situated in this case in one sector 4 of the disc. The consecutive video tracks, being either concentrical circles or a continuous spiral, can be connected to each other, but it may be advantageous to reserve a sector 6 which does not contain any information whatsoever. This sector can act, for example, as a starting or orientating area. If so preferred for further processing, a video track can also contain a singular, i.e. a non-interlacing, television image. Each video track comprises areas 7 which are orientated in the track direction and which can be optically detected. The information carrier shown is rotatable about an axis 8. The carrier can also have another shape, for example, that of a cylinder where all tracks are equally long, and are provided on the surface thereof in the form of coaxial circles or in the form of a continuous helix. The information carrier can also be formed by a flat rectangular plate which is to be provided on or in a carrier cylinder, an informationless portion then being present at the area of the gluing seam. The transition will not have a disturbing effect when reading out is performed in a contactless manner.

According to the invention the address is provided in the informationless part of the video signal, i.e. in the sector 4 in this case. An adequate structure should preferably be always present in the sectors 4 and 6 so as to make a read sensor follow the track. For writing in the address, use can be made of a device which is provided with an encoding circuit as shown in the form of a block diagram in FIG. 2. In this circuit, controlled by the television signal to be recorded, are provided a divide-by-two circuit 10 which alternately blocks and passes the television frame synchronization pulse, so a single pulse for each video track on the record is produced. The output of the divide-by-two circuit 10 is connected to a counter 11 which is coupled to a multiplexer 12.

The television frame synchronization pulses are applied, together with the line synchronization pulses, to a line selector 13 which switches on a squarewave generator 14 during television image lines to be selected. The television lines in which an address will be written are thus selected in the line selector. According to the invention, this is part of the informationless video lines at the beginning of the video signal. The encoded address is applied to an adder 15, to which the television signal to be recorded is also applied. In the adder the encoded address is taken up in the video signal at the selected location, so that an addressed video signal is realized. For an information carrier or video record comprising 45000 tracks a sequential number from 00000 to 45000 can thus be associated with each track; for this purpose, for example, a code expressed in 4 bits can be used for each digit.

For reading out the information when the address is called for, use can be made of a device which is provided with a decoding circuit as shown in the form of a block diagram in FIG. 3. This circuit comprises a line selector 20 which is controlled by the frame synchronization pulse and which applies the relevant part of the video signal to a shift register 24 via a switch 21 and couples a squarewave generator 22 to the latter register via a switch 23. In the other position of the switches 21 and 23 line synchronization pulses are applied to the shift register. These pulses are also applied to a divider 25 introducing a division which corresponds to the number of bits of each digit of the address. The divider 25 controls a register 26 which is coupled to the shift register and which is also adapted to the number of bits of each digit. The divider 25 furthermore controls a display panel 28 via a counter 27. The display panel 28 displays the selected address and any further characteristic information in the form of digits. The correctness of the image can be readily checked by arranging this digit panel in the vicinity of a monitor which displays the image.

FIG. 4 is a diagrammatic view of a preferred embodiment of a device according to the invention for recording radiograms. The device comprises a known X-ray apparatus having an X-ray tube 29 and an X-ray image intensifier tube 30 between which an object or a patient 31 can be arranged. A television camera tube 32 is coupled to the image intensifier tube 30. A video signal which is obtained from the television camera tube 32 can be simultaneously applied to a monitor 33 and to a device comprising an encoding circuit 34 and a write apparatus 35. The encoding circuit is as described with reference to the FIG. 2. The write apparatus is of the type described in U.S. Ser. No. 396,399, filed Sept. 12, 1973. In a preferred embodiment a plurality of video records 36 can be written in simultaneously by means of the write apparatus. This can be advantageous if, as in the present case, only a few copies are required for storage. The carrier can be adapted thereto and be made of, for example, glass or a comparatively readily etchable material. It is often economical to store the addressed or non-addressed radiograms first in an erasable magnetic store and to transfer these to a video record only if there is a given supply of appropriate images, for example, enough to fill a complete video record. The magnetic store is then vacated again. A video recorder 37 with a magnetic store 38 can be added to the device for this purpose. The signals written in the magnetic store 38 as well as in the video record 36 can be displayed on the monitor 33 for checking purposes. Besides the address, all kinds of alphanumerical data of the patient can be written in for each radiogram or for each series of related radiograms. These data can be recorded in the form of a caption which preferably also contains the track number, but it is alternatively possible to reserve an additional video track for this purpose. In the latter case addressing can be restricted to recording one address for every two tracks.

FIG. 5 shows a preferred embodiment where the video record according to the invention is used as a store for texts which can be automatically retrieved; an example of such an application is an information retrieval system for researching texts, all texts being classified according to subject. With a system of this kind, it would be advantageous, for example, to use one video record for each subject. For searching the correct video track, i.e. the relevant text, the procedure can be, for example, as follows. Each image on the video record comprises sufficient characteristic information of a text and has also a number as an address, the said number corresponding to the track number. Each number is also taken up in the image of the text in analog or digital form. The number of the record and the track number of the relevant text are stored in a computer store. After retrieval, the said code of the located text is applied to a playback apparatus for the video record, either automatically or by operation of a keyboard. In the preferred embodiment shown in FIG. 5 the playback apparatus comprises a motor 40 with a transport mechanism 41 by means of which a support 43 can be displaced over a video record 42 in the radial direction. This movement can be performed fully analogously to known selection operations for magnetic storage discs. A first command brings the pick-up element in the vicinity of the desired track, while the correct track is ultimately selected by a finer mechanism which is further controlled by information derived from the record (track number). The selected track numbers are compared in a comparison unit 45 with the track number given by a computer 46. When the correct track has been reached, the image or the information from this track can be displayed as a stationary image until a subsequent image is requested. For display purposes a playback apparatus 50 is provided which receives the information from the detector 44, for example, via a link 49, the display apparatus 50 also being connected, via a link 51, to the comparison circuit 45 for comparison of the actual track number with the track number dictated by the computer 46. A further preferred embodiment according to the invention consists of a device which is known as a teaching machine. The video record according to the invention, provided with addresses and possibly retrieval information, can then be displayed by calling for a desired code number. The method of searching can be analogous to that used for literature retrieval. Video records for this purpose can contain all sorts of educational information, it also being possible, by means of an appropriately chosen information code, to associate, for example, a question and its answer. As the video record is read out in a contactless manner, the alternating display and nondisplay (for noting an answer, for repeating spoken text and the like) imposes no problem whatsoever. A computer incorporated in the teaching machine can then be provided with a program which can be adapted to the quality of the pupil's answers, thus automatically calling forth an adapted sequence of images. A major advantage of a video record according to the invention is that switching back to a previous image is possible at random. A video record according to the invention is also excellently suitable for recording physical of chemical processes. In this respect we think of phase transitions in the case of temperature variations where the information code can be directly coupled to the temperature. To this end a video recorder for a video record of this kind can be coupled to an image forming device in which such a process is to be made visible, for example, an electron microscope. A duration of approximately 30 minutes, i.e. the playing time of the record, is not unusual in this respect.

Sound can also be recorded in the video tracks of a video record. As a much smaller bandwidth can be used, an extremely large quantity of audio information can be recorded on one record by using different kinds of modulation, making it possible to record, for example, a number of music programs in a single track. The addition of an information code according to the invention enables simple retrieval of a desired item. A record of this kind can thus replace, for example, a whole gamma of grammophone records such as of a juke-box, while at the same time the vulnerable record-changing equipment can dispensed with.

What is claimed is:

1. An information carrier in the form of a record disc for recording video information of the type wherein said information is recorded in a series of adjacent sequential tracks as a sequence of blocks of information optically encoded in geometrical form along the tracks, the improvement wherein each succeeding block of information along each track comprises a recorded video frame and a unique address code, each recorded video frame starting on a radial line on the disc, and each unique address code starting on a further line on the disc, the address codes therefore being contained within a sector on the disc.

2. An information carrier as claimed in claim 1, wherein the address code being provided within the television lines which are situated between the recorded video synchronization pulses and the image information.

3. An information carrier as claimed in claim 1 wherein each individual information track is provided with an information code.

4. An information carrier as claimed in claim 3, wherein the information code of each track contains a sequential track number.

5. A device for recording video information, comprising recording means for optically encoding an information carrier with a sequence of blocks of information as a series of geometrical forms in adjacent sequential tracks, each succeeding block of information comprising a video frame portion and a code portion, electronic encoding means for providing a plurality of unique codes, and synchronization means connecting said electrical encoding means and said video information to said optical encoding means for causing said optical encoding means to sequentially record a frame of video information starting on a radial line on the disc and one record of said codes starting on a further radial line on said disc as optically encoded geometrically patterns followed by a further video frame starting on said radial line, and a further different code starting on said further radial line.

* * * * *